United States Patent Office.

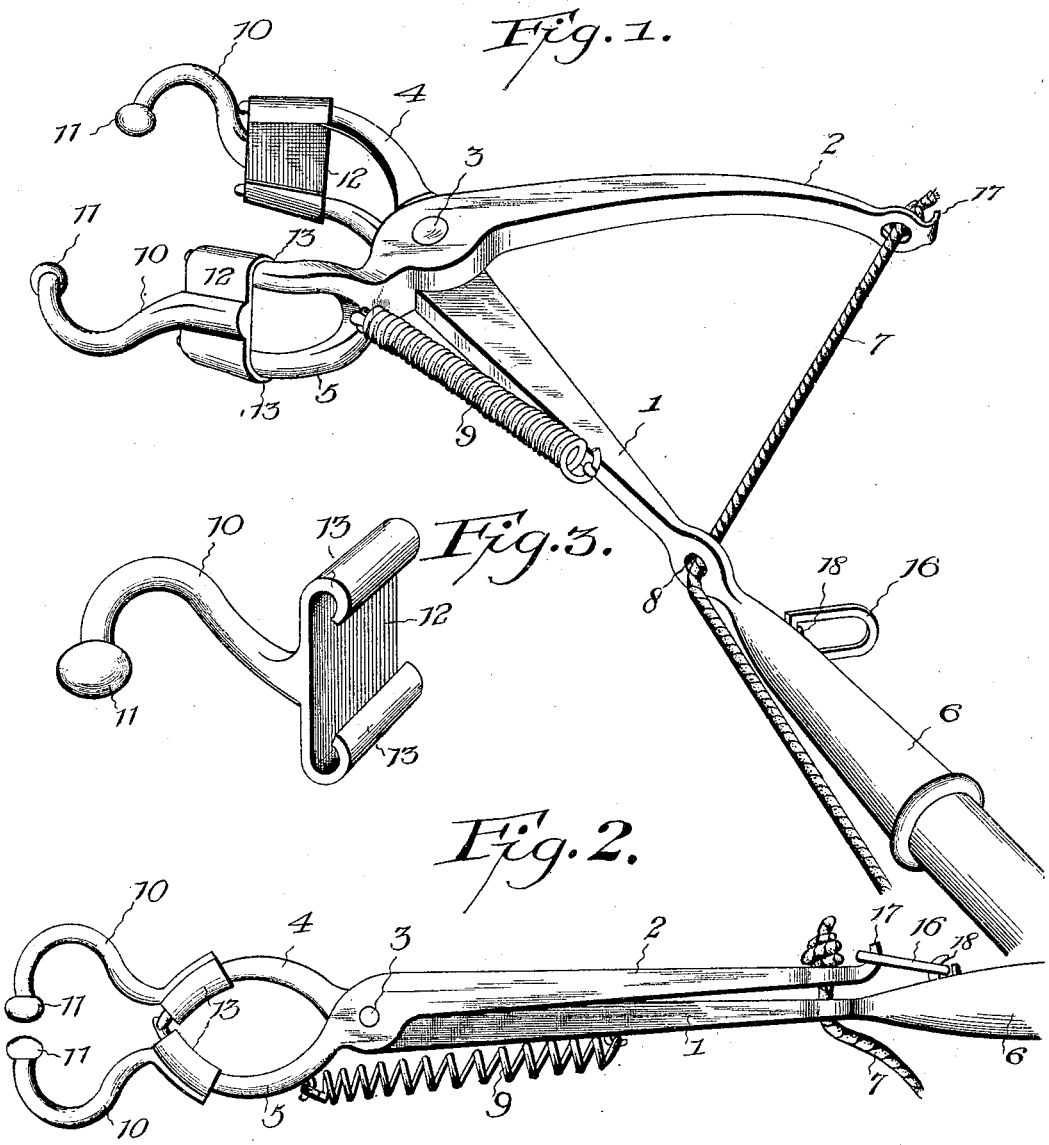

WASHINGTON E. TIDLER, OF CICERO, INDIANA, ASSIGNOR OF ONE-HALF TO S. C. TIDLER, OF SAME PLACE.

ANIMAL-CATCHER.

SPECIFICATION forming part of Letters Patent No. 611,744, dated October 4, 1898.

Application filed November 10, 1897. Serial No. 658,050. (No model.)

*To all whom it may concern:*

Be it known that I, WASHINGTON E. TIDLER, a citizen of the United States, residing at Cicero, in the county of Hamilton and State of Indiana, have invented a new and useful Animal-Catcher, of which the following is a specification.

The invention relates to improvements in animal-catchers.

The object of the present invention is to improve the construction of animal-catchers and to provide for hog-catchers an attachment adapted to be readily applied to and removed from the jaws and capable of gripping cattle by the nose and enabling them to be thereby caught and held.

The invention consists in the construction and novel combination and arrangement of parts, as hereinafter fully described, illustrated in the accompanying drawings, and pointed out in the claims hereto appended.

In the drawings, Figure 1 is a perspective view of an animal-catcher constructed in accordance with this invention, the device being open and arranged for engaging the nose of the animal. Fig. 2 is a side elevation showing the device closed and locked in such position. Fig. 3 is a detail perspective view of one of the nose-engaging arms or prongs.

Like numerals of reference designate corresponding parts in the several figures of the drawings.

1 and 2 designate bars or members connected between their ends by a pivot 3 and having their outer portions curved to form jaws 4 and 5. One of the bars or members is extended and provided with a socket 6 for the reception of a suitable pole, and the other bar or member is provided with an eye, to which is attached a rope 7, that passes through an eye or opening 8 of the bar or member 1 and extends along the pole, whereby when the rope is drawn taut the bars or members will be operated to close the jaws. The jaws are maintained normally open by a spiral spring 9, connected at one end to the jaw 5 by a lug and having its other end similarly connected to the bar or member 1. The spring holds the device in position so that the jaws may be pressed against the leg of an animal and then closed by pulling on the rope. The jaws are forked or bifurcated and are adapted to receive nose-engaging arms or prongs 10, which are curved, as shown, and adapted to engage cattle by the nose for catching and holding them. Each nose-engaging arm 10, which is substantially semicircular, is provided at its outer engaging end with an enlargement or knob 11, and it is detachably connected with the hog-catcher by a transverse plate or clip 12, which is provided at opposite sides with tapering sleeves or eyes 13, formed by rolling the ends of the plate inward on themselves, as clearly shown in the accompanying drawings. The eyes or sleeves of the clips or plates detachably receive the prongs formed by bifurcating the jaws, and when the latter are closed, as illustrated in Fig. 2 of the accompanying drawings, they overlap slightly at the points and lock the attachments on them. When the jaws of the hog-catcher are closed, the knobs or enlargements of the engaging ends of the arms are slightly separated to avoid injuring the nose of an animal.

The attachments or nose-engaging devices are removed from the jaws 4 and 5 when the device is employed for engaging the leg of a hog.

The device is locked in its closed position by a link 16, hinged to the bar or member 1 and engaging a lateral projection 17 of the bar or member 2. The link is hinged to the bar or member 1 by means of a pair of lugs 18, embracing and confining one end of the link.

The invention has the following advantages: The nose-engaging attachments or devices are simple, strong, and durable and adapted for grasping an animal by the nose without injuring it. They are detachably mounted on the jaws of the hog-catcher and may be readily removed when it is desired to catch hogs, and the jaws of the hog-catcher lock the nose-engaging devices on them when they are closed. The link, which directly engages the bar 2, forms an efficient locking device for securing the jaws in their closed position and retaining them in engagement with an animal.

Changes in the form, proportion, and minor details of construction may be resorted to without departing from the spirit or sacrificing any of the advantages of this invention.

What I claim is—

1. In a device of the class described, the combination with a pair of bars or members pivoted together and provided with jaws for engaging a leg of an animal, of a pair of nose-engaging devices mounted on the jaws and provided with arms having their engaging ends slightly separated when the jaws are closed to avoid injuring the nose of an animal, substantially as described.

2. In a device of the class described, the combination with a pair of bars or members pivoted together and provided with jaws for engaging the leg of an animal, of a pair of nose-engaging devices detachably mounted on the jaws and provided with arms located in advance of the jaws, substantially as and for the purpose described.

3. In a device of the class described, the combination of a pair of bars or members, pivoted together and provided with jaws bifurcated to form prongs, and a pair of nose-engaging devices comprising arms located in advance of the jaws, and transverse plates or clips provided with eyes or sleeves receiving the prongs of the jaws, substantially as and for the purpose described.

4. In a device of the class described, the combination with a pair of bars or members pivoted together and provided with jaws, of a pair of nose-engaging devices mounted on the same and provided with substantially semicircular arms extending in advance of the jaws and having their outer ends enlarged to form knobs, the latter being slightly separated when the jaws are closed, substantially as and for the purpose described.

In testimony that I claim the foregoing as my own I have hereto affixed my signature in the presence of two witnesses.

WASHINGTON E. TIDLER.

Witnesses:
CHARLES QUEAR,
ANTON JENSEN.